United States Patent [19]

Fischer et al.

[11] Patent Number: 5,175,249

[45] Date of Patent: Dec. 29, 1992

[54] PROCESS FOR THE ISOLATION AND PURIFICATION OF POLYARYLENE SULPHIDES

[75] Inventors: Thomas Fischer; Wolfgang Arlt; Manfred Schmidt, all of Krefeld, Fed. Rep. of Germany

[73] Assignee: Bayer Aktiengesellschaft, Leverkusen, Fed. Rep. of Germany

[21] Appl. No.: 825,372

[22] Filed: Jan. 24, 1992

[30] Foreign Application Priority Data

Feb. 5, 1991 [DE] Fed. Rep. of Germany ....... 4103345

[51] Int. Cl.⁵ .................. C08G 75/14; C08G 75/18
[52] U.S. Cl. .................................. 528/499; 528/388; 528/481; 528/488

[58] Field of Search ............... 528/499, 388, 481, 488

[56] References Cited

U.S. PATENT DOCUMENTS 4,963,651 10/1990 Nesheiwat .......................... 528/499
5,037,954  8/1991 Nesheiwat .......................... 528/499

Primary Examiner—Morton Foelak
Attorney, Agent, or Firm—Connolly & Hutz

[57] ABSTRACT

This invention relates to a process for the isolation and purification of polyarylene sulphides, preferably polyphenylene sulphides, from their reaction mixture. The process requires no organic solvents for the purification (washing) of the polymer.

8 Claims, 2 Drawing Sheets

PROCESS FOR THE ISOLATION AND PURIFICATION OF POLYARYLENE SULPHIDES

This invention relates to a process for the isolation and purification of polyarylene sulphides, preferably polyphenylene sulphides, from their reaction mixture. The process requires no organic solvents for the purification (washing) of the polymer.

Polyarylene sulphides (PAS), their preparation and their isolation are known (e.g. U.S.-A 2 513 188). A sulphur donor, e.g. sodium sulphide, is reacted with a dichlorinated aromatic compound, e.g. p-dichlorobenzene, in a polar, aprotic solvent. Polyphenylene sulphide, for example, may be obtained from this process.

For the isolation of polyarylene sulphides, the salt-laden heterogeneous PAS product solution is generally mixed with an auxiliary substance after the reaction so that the PAS precipitates. The inorganic salts are washed out of the precipitated polyarylene sulphide, e.g. with water. The polymer which contains up to 500% by weight (based on the polyarylene sulphide) of water and/or other extracting agents may then be dried mechanically or at an elevated temperature, optionally in a vacuum (e.g. DE-A 3 713 669). Common to these known processes is that the polyarylene sulphide prepared is precipitated or crystallised and then washed. An organic solvent is in some cases used for the washing process (e.g. DE-A 3 713 669, EP-A 140 272, EP-A 166 368).

These methods of working up have the following disadvantages:
the aqueous and/or organic washing liquors must be worked up (e.g. distilled);
the solvent for the reaction, e.g. N-methyl-caprolactam or N-methylpyrrolidone, is liable to be partly decomposed by the addition of water;
the crystallised polymer is difficult to wash;
washing liquids containing salt must be worked up by a difficult procedure.

The process according to the invention departs fundamentally from these steps for the isolation of PAS, preferably polyphenylene sulphide, from their reaction solutions. The reaction solution is filtered after polymerization and may thus be freed from the alkali metal halides which are formed at the same time. The reaction solvent is distilled off and the PAS melt obtained is subsequently washed with water. The purified PAS melt may then be granulated, for example, or subjected to vacuum extrusion.

The invention relates to a process for the recovery of polyarylene sulphides from their reaction mixtures, characterized in that
a) the reaction solvent is not contacted with any other detergent,
b) the reaction mixture is worked up at a constant or increasing temperature, and
c) the salt formed is removed from the reaction mixture in a temperature range whose lower limit is determined by the temperature at which the polyarylene sulphide formed is still soluble in the reaction solvent while the upper temperature limit is that temperature at which the reaction solvent and the polyarylene sulphide formed are still thermally stable,
d) the separated salts formed are subjected to an after-washing with the reaction solvent within the temperature limits defined under c),
e) for recovery of the reaction solvent, the separated salts are dried at a temperature whose upper limit is determined by the thermal stability of the reaction solvent while the minimum pressure during drying is determined by the capacity of the reaction solvent for condensation,
f) the polymer produced is isolated from the filtrate,
g) the filtrate, which is then in the form of a melt, is subjected to washing with water at pH < =6 without lowering of the temperature, and
h) the now acid polyarylene sulphide melt is washed with water under pressure until neutral without lowering of temperature, and
i) the pressure of this polyarylene sulphide melt which has been washed neutral is reduced from the extraction pressure to 0.001-1 bar, preferably 0.01-1 bar, and the said melt is isolated by vacuum extrusion or direct granulation.

The invention is preferably used for the purification of straight chained or branched polyphenylene sulphides (e.g. EP-A 171 021). The isolation and purification of straight chained or branched polyphenylene sulphide by the process according to the invention is particularly preferred.

The reaction solvents used are polar, aprotic organic solvents. N-alkyllactams are preferably used. N-methylcaprolactam (NMC) is particularly preferred.

At step b), the temperature is from 200 to 400° C., preferably from 220 to 340° C. The temperature may be kept constant during step b) or raised within the stated ranges.

In step c), salts formed in the reaction, e.g. sodium chloride, and residues of alkali metal sulphides are separated off in the temperature range mentioned for b).

Steps d) and e) are also carried out at the temperature range mentioned for step f).

In step e), the pressure is from 1 to 2000 mbar.

Figure 1:
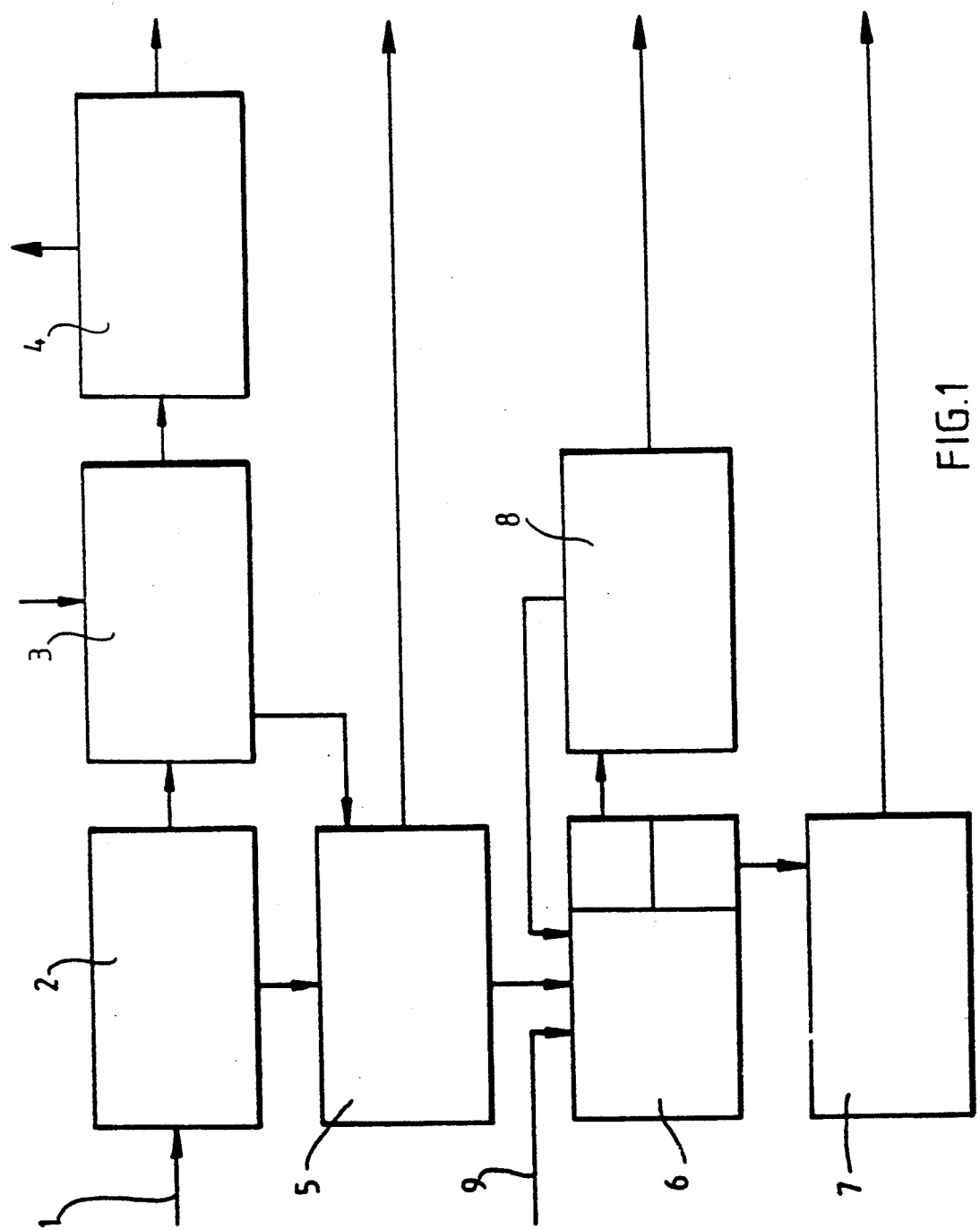
FIG. 1 illustrates the course taken by the process according to the invention.

The course taken by the process according to the invention is illustrated in FIG. 1. It is characterized in that the reaction solution is not cooled as hitherto but instead, the temperature is raised in the course of working up of the product (aniothermic process).

The salt formed in the reaction is removed from the reaction solution (reference numeral 1 in FIG. 1) at (2), e.g. by filtration (e.g. EP-A 220 490). The pressure filtration described there, however, only allows for layers of small thickness. Decanting also is not advantageous because a machine having rotating parts undergoes rapid wear under the chosen temperature conditions and the abrasive action of the alkali metal halide.

The process according to the invention avoids these disadvantages and problems. These are solved by the special construction of the filter and the employment of deep bed filtration.

Suitable filters are described in:
1 H. Wilke, Chem.-Ing.-Techn. 30 (1958), pp. 219–222,
2. M. Apperlo, Chemiker Zeitung 91 (1967), pp.440–445,
3. Anonym, Chemieanlagen und Verfahren, Apr. (1987), pp. 94.

The use of deep bed filtration with the filters described enables particles smaller than the largest diameter of the filtration layer to be separated. The turbid liquid obtained at the onset of filtration is returned to the upstream side of the filter until the liquid runs clear.

For obtaining residues of polyarylene sulphides from the salt which has been separated, the separated salt may be washed with pure, hot reaction solvents (displacement washing), preferably at the site of filtration.

In a second step, an inert gas, e.g. nitrogen, is passed through the filter cake adhering to the filter and the filter cake is to a large extent freed from the reaction solvent and the PAS dissolved therein.

The filter used may be, for example, an apparatus which
a) requires no moving parts,
b) allows after-washing to be carried out with hot reaction solvent on the filter,
c) is suitable for deep bed filtration,
d) can be back-washed and
e) is heatable.

The almost dry cake is detached in a third step (e.g. by application of excess pressure up to 10 bar).

If high standards of purity with respect to residual polymer content are required of the alkali metal halide filter cake, the filter cake may be washed again with the reaction solvent at the same temperature as that used for filtration (3). At this stage, the filter cake is suspended in the reaction solvent and again subjected to the filtration process described.

This step is followed by salt drying (4) for the recovery of residues of reaction solvents present in the washed filter cake, e.g. in a rotary tubular furnace or in a paddle screw. The filter cake is at this stage subjected to temperatures above the boiling point of the pure reaction solvent. A vacuum may be applied to improve evaporation. The pressure employed is determined by the vapour pressure of the reaction solvent used and is at least equal to the pressure which it would have as a pure substance at 60° C.

The salt obtained from the salt drying is substantially free from organic components and may be recycled, for example for recovery of the chlorine and sodium hydroxide solution used as starting materials. The starting materials for the reaction are thereby enabled to be kept in circulation.

The polymer (2) which is separated as a solution and is substantially free from salt is isolated, e.g. by concentration by evaporation in one or more stages, (up to 5 stages) so that the polymer is obtained as a solvent-free melt. According to the invention, solutions of polyarylen sulphides and reaction solvents can be concentrated by evaporation at a continuously rising temperature and with constantly increasing viscosity.

The process according to the invention is particularly advantageous under these conditions because separation may be carried out in an alkaline medium of the reaction mixture. The materials of the apparatus are found to undergo less corrosion than in processes employing evaporation in an acid medium. It is also particularly advantageous that many substances which may be present in the reaction solution (e.g. HCl, $H_2S$, phenolic chain terminators) are prevented by the alkaline medium from being released in a gaseous form. The distillate obtained may therefore be directly used again as reaction solvent in a subsequent reaction.

The process according to the invention is particularly advantageous on account of the fact that the reaction solvent is not mixed with detergents. This provides an economic advantage in that the elaborate working up of a mixture of detergent and reaction solvent is now unnecessary and partial chemical degradation of the reaction solvent by a reaction with detergent, e.g. water, is also avoided.

The polyarylene sulphide melt largely freed from reaction solvent flows from stage (5) to a stage (6) of washing with acid water (e.g. with dilute HCl). For this purpose the polyarylene sulphide melt is contacted with an aqueous solution of an acid at pressures in the region of 100 bar and at a $p_H<6$ without lowering of the temperature. The advantage of this acidification compared with the acidification known from the literature of a suspension of polyarylene sulphide in water is that the two phases, the melt and the aqueous acid, can be intimately mixed together.

Inclusions of impurities which may later lead to lowering of the quality of the PAS, e.g. due to ash formation, are thus avoided. In addition, this process step according to the invention is characterized in that the washing process can be carried out without great expenditure of time.

The acid washing may be carried out e.g. in a stirred autoclave, in a static mixer or in a pressure extraction column.

Separation of the mixed phases is carried out isobarically in a suitable settling vessel, e.g. in a separator.

In a subsequent step, the polymer which has been made acid is subjected to one or more washings with neutral water in the same apparatus, as far as possible isobarically and isothermally, for removing residues of the acid.

Washing may be carried out in the same apparatus or in a separate apparatus. The pressure in the wash water obtained from the two steps is reduced from the extraction pressure to normal pressure (6). The wash water contains residues of the salts formed, reaction solvent and any by-products formed.

The steam produced when the pressure is released is condensed and the spent acid is replaced. This stream is then used again as washing medium. The residue obtained is disposed of in an orderly manner (e.g. burnt or transferred to a waste dump).

The pressure in the polymer melt which has been washed neutral and separated from the aqueous phase is reduced from the extraction pressure to normal pressure (7) and traces of dissolved water evaporate at the same time. The polymer melt may then be worked up by conventional methods, e.g. by extrusion. It is advantageous to use an evaporation extruder, in which the PAS may be obtained as a granulate after a vacuum extrusion. The polymer melt may also be transferred directly to granulation through a spinning die by means of a melt pump.

The temperatures of the individual process steps depend on the chosen reaction solvent and on the polyarylene sulphide produced.

EXAMPLES

Example 1

A polyphenylene sulphide (PPS) prepared according to Example 1 of DE-A 3 839 441 was transferred at a temperature of 235° C. to a filter which was heated to 250° C. The solvent was in this case N-methylcaprolactam.

|                 | Analyses |               |
|-----------------|----------|---------------|
|                 | Filtrate | Filter residue |
| PPS             | 1390 g   | 242 g         |
| Solvent         | 4860 g   | 860 g         |
| Sodium chloride | 6 g      | 1586 g        |

The filter residue obtained was mixed again with double the quantity of solvent (based on the quantity of filter residue) at 235° C. and again filtered. The filter residue now obtained was washed with the single quantity of solvent (based on the quantity of filter residue) by a displacement washing.

|                 | Analyses       |
|-----------------|----------------|
|                 | Filter residue |
| PPS             | n.d.*          |
| Solvent         | 30%            |
| Sodium chloride | 70%            |

*n.d. = not detectable.
limit of detection: 1% PPS

Example 2

The filtrate obtained in Example 1 was concentrated by evaporation.

Figure 2:
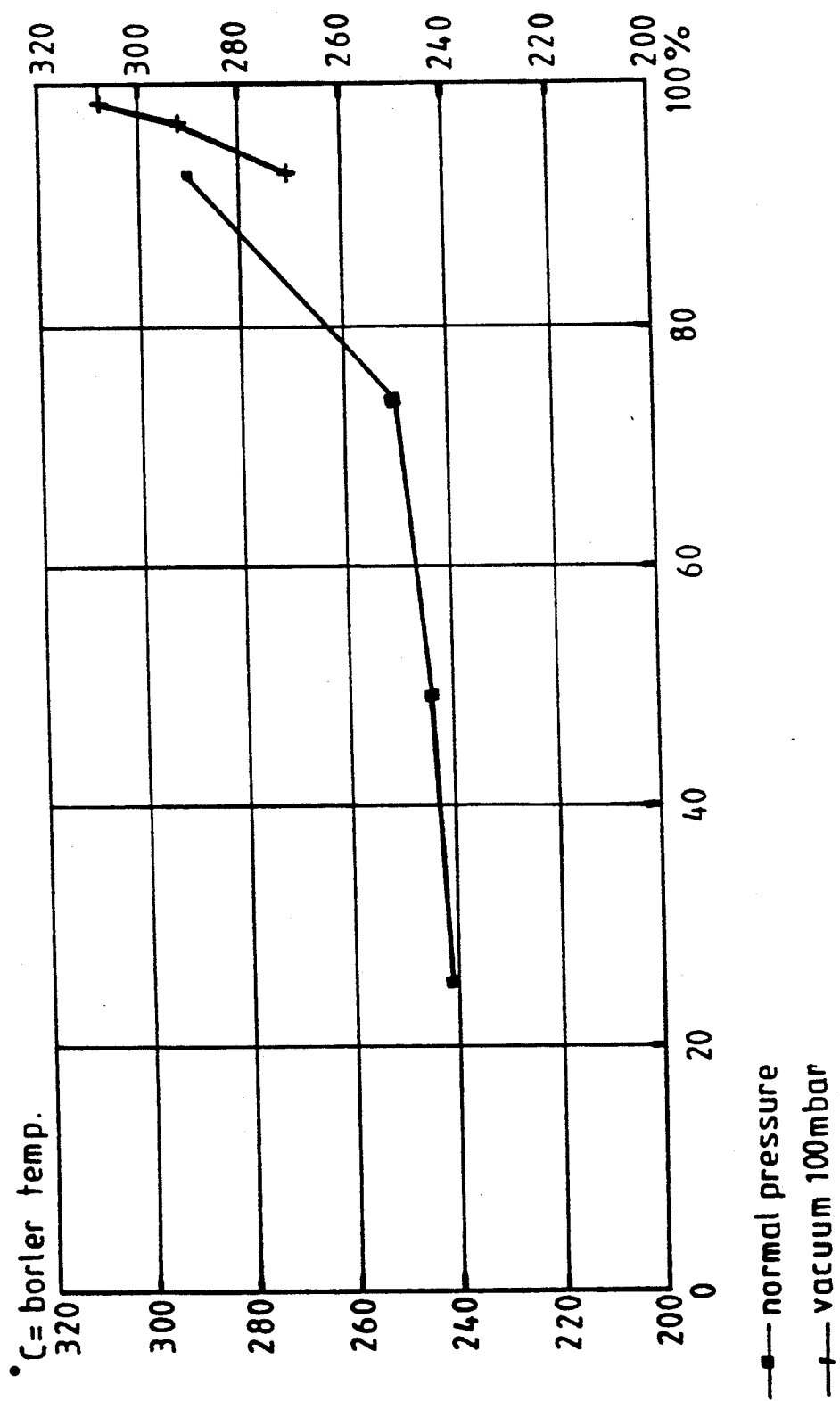
FIG. 2 illustrates an evaporation curve.

The evaporation curve obtained is shown in FIG. 2. It shows that with the experimental arrangement chosen, the filtrate solution can be evaporated down to a PPS content of 98% by weight. An increase in the evaporation rate can generally be obtained by raising the temperature or lowering the pressure. The distillate obtained may be circulated.

Example 3

The anhydrous PPS melt obtained in Example 2 was washed with dilute hydrochloric acid (pH 4) under pressure and then washed with water until neutral.

| Data |  |
|------|------|
| Temperature | 300° C. |
| Pressure | 100 bar |
| Molecular weight of the polymer before treatment | $M_w = 38148$ |
| Molecular weight of the polymer after treatment | $M_w = 39135$ |

(Molecular weight determination as described in DE-A 38 39 441).

We claim:

1. A process for the recovery of polyarylene sulphides from their reaction mixtures including a reaction solvent, characterized in that
   a) the reaction solvent is not contacted with any other detergent,
   b) the reaction mixture is worked up at a constant or rising temperature, and
   c) the salts formed are removed from the reaction mixture within a temperature range whose lower temperature limit is determined by the temperature at which the polyarylene sulphide formed is still soluble in the reaction solvent and whose upper temperature limit is determined by the temperature at which the reaction solvent and the polyarylene sulphide formed are still thermally stable,
   d) the separated salts formed are subjected to an after-washing with the reaction solvent within the temperature limits defined under c),
   e) for recovery of the reaction solvent, the separated salts are dried within a temperature range whose upper limit is determined by the thermal stability of the reaction solvent while the minimum pressure during drying is determined by the capacity for condensation of the reaction solvent,
   f) the polymer produced is isolated from the filtrate,
   g) and is then present as a melt which is subjected to washing with water at pH < = 6 without lowering of the temperature, and
   h) the now acid polyarylene sulphide melt is washed with water until neutral without lowering of the temperature, and
   i) the pressure in this polyarylene sulphide melt which has been washed until neutral is reduced from the extraction pressure to a pressure of from 0.001 to 1 bar, and the polyarylene sulphide melt is isolated by means of a vacuum extrusion or direct granulation.

2. A process according to claim 1, characterized in that the reaction mixture is filtered at a temperature of from 225° to 250° C. and a pressure of from 1 to 10 bar and the alkali metal halide which has been filtered off is repeatedly filtered under these temperature/pressure conditions after suspension in the reaction solvent.

3. A process according to claim 1, characterized in that the apparatus chosen as filter is one which
   a) requires no moving parts,
   b) enables after-washing with hot reaction solvent to be carried out on the filter,
   c) enables deep bed filtration to be carried out,
   d) can be back-washed and
   e) is heatable.

4. A process according to claim 1, characterized in that the reaction solvent is N-methylcaprolactam.

5. A process according to claim 1, characterized in that the solvent is N-methylpyrrolidone.

6. A process according to claim 1, characterized in that the polyarylene sulphide which is worked up is polyphenylene sulphide.

7. A process according to claim 1, characterized in that the dried alkali metal halide filtration cake is returned for re-use.

8. Process according to claim 1 wherein the reduction of extraction pressure in step i) is from 0.01 to 1 bar.

* * * * *